United States Patent
Epple et al.

[11] Patent Number: 6,048,936
[45] Date of Patent: Apr. 11, 2000

[54] ACRYLATE POLYMERS BASED ON POLYESTER RESINS OR POLYESTER OLIGOMERS

[75] Inventors: Ulrich Epple; Gert Dworak; Ulrike Kuttler; Claudia Pietsch, all of Graz, Austria

[73] Assignee: Vianova Resins AG, Graz, Austria

[21] Appl. No.: 09/130,489

[22] Filed: Aug. 7, 1998

[30] Foreign Application Priority Data

Aug. 7, 1997 [AT] Austria ................................ 1326/97

[51] Int. Cl.$^7$ ..................... C09D 133/02; C09D 133/14; C08L 33/02; C08L 33/14
[52] U.S. Cl. ..................... 525/124; 525/10; 525/131; 525/162; 525/163; 525/170; 525/176; 525/437; 525/439; 525/440; 525/443; 525/444
[58] Field of Search ............................. 525/445, 10, 176, 525/124, 131, 162, 163, 170, 437, 439, 440, 443, 444

[56] References Cited

U.S. PATENT DOCUMENTS

| | | |
|---|---|---|
| 5,326,820 | 7/1994 | Hoffmann et al. . |
| 5,460,892 | 10/1995 | Bederke et al. . |
| 5,480,936 | 1/1996 | Duecoffre et al. . |
| 5,723,537 | 3/1998 | Bajorat et al. . |

FOREIGN PATENT DOCUMENTS

| | | |
|---|---|---|
| 0 626 432 A1 | 11/1994 | European Pat. Off. . |
| 42 29 196 A1 | 3/1994 | Germany . |

*Primary Examiner*—Patricia A. Short
*Attorney, Agent, or Firm*—Foley & Lardner

[57] ABSTRACT

Acrylate copolymers AB obtainable by polymerization of a monomer mixture A in an organic solvent or in bulk, the monomer mixture A comprising proportions by mass of from 25 to 80% of $C_1$–$C_{20}$-alkyl (meth)acrylates whose alkyl radicals can be linear, branched or cyclic, from 1 to 28% of $C_2$–$C_{20}$-hydroxyalkyl (meth)acrylates whose hydroxyalkyl radicals can be linear, branched or cyclic, from 0.5 to 20% of $\alpha,\beta$-unsaturated carboxylic acids and from 0 to 55% of aromatic vinyl compounds or aliphatic vinyl esters and vinyl ethers, vinyl halides, olefinically unsaturated ketones or aldehydes, esters of glycidyl alcohol or methylglycidyl alcohol with olefinically unsaturated carboxylic acids, or nitriles of $\alpha,\beta$-unsaturated carboxylic acids, in the presence of free-radical polymerization initiators and of at least one polyester or polyester oligomer B obtainable by polycondensation of polyoles and polycarboxylic acids and having a hydroxyl number of from 50 to 350 mg/g, an acid number of from 1 to 50 mg/g and a weight-average molar mass $M_w$ of up to 5000 g/mol, with the provisos that the polyester or the polyester oligomers are free from olefinic double bonds, that the proportion by mass of component B in the end product AB is less than 10% of its mass and that this end product has an acid number of from 5 to 45 mg/g, a hydroxyl number of from 40 to 125 mg/g and a weight-average molar mass $M_w$ of not more than 10,000 g/mol and a polydispersity $(=M_w/M_n)$ of 3 or less than 3. The copolymers can be employed in coating compositions for metals, plastics, wood, leather, textiles, paper and building materials.

11 Claims, No Drawings

ACRYLATE POLYMERS BASED ON POLYESTER RESINS OR POLYESTER OLIGOMERS

BACKGROUND OF THE INVENTION

The two-component polyurethane coating materials that are in use today, based on hydroxyl-containing polyesters or polyacrylates, have to meet various requirements depending on the coated substrate.

For instance, two-component clearcoats for automotive refinish should possess excellent hardness, very good adhesion to the basecoat, outstanding solvent resistance (to super-grade petroleum, for example) and good weather stability. For these reasons, preference is given to the use of hydroxyl-containing polyacrylate resins or weather-stable polyesters whose chain molecules possess inherent rigidity.

Modern binders should additionally meet the requirements of environmental protection for high-solids and low-solvent coating materials. For this purpose use is made in particular of low molecular mass polyacrylates (See EP-A 0 638 591, EP-A 0 680 977) or polyesters (See EP-A 0 705 858), in some cases with the addition of oligomers or reactive diluents, i.e. organic compounds which are able to react with polyisocyanates as well (See EP-A 0 741 149, EP-A 0 741 158). The use of such binders in automotive refinish surfacers, i.e. highly pigmented systems, is likewise known (See EP-A 0 680 977, EP-A 0 773 247).

In the sector of automotive OEM finishing (e.g. one-component paints that are crosslinked using melamine resins), the key requirements for high-solids coating materials are different in nature. For instance, it is additionally important to achieve good mar resistance and resistance to acid rain. These properties are influenced substantially by the binder structure. Hence in this sector there is predominant use of acrylate resins having flexible monomer units and units with long linear or branched alkyl side-chains, chains, which give the coating composition inherent flexibility.

Besides the automotive sector, OH-functional acrylate resins or polyester resins are employed in general industrial coating. This embraces the large market segment of the coating of metals, plastics, and wood. While metallic substrates are coated predominantly with pigmented systems, plastic and wooden pieces are coated mainly using clearcoats. Binders are employed specifically in the sector of general industrial coating which not only have good applicability, rapid drying, good weathering stability, high gloss and fullness but also achieve a high surface quality. This means that the products should exhibit good levelling without developing the orange peel effect.

In these various application sectors it is known to blend acrylate resins and polyester resins, to produce physical mixtures or blends, in order to obtain the specific profiles and properties that are required. In this case the acrylate resins provide the gloss and weathering stability and the polyester the fullness and surface quality. However, for the producer of synthetic resins who wishes to supply the paint manufacturer with a finished, high-solids binder system it is highly complex to not only synthesize the individual components of low molecular mass but also to select and blend appropriate, compatible binders which lead to highly transparent binder systems. As a result, there has been an increase in recent times in efforts to circumvent the selection and blending of appropriate, environment-friendly binder partners by means of suitable integrated synthesis steps (See EP-A 0 776 920). Here, polyester acrylate-based binders are described that are composed of proportions by mass of from 10 to 90% polyester and from 90 to 10% acrylate resin. The polyesters are, in part, oligomers having molar masses of up to 5000 g/mol. It is precisely these polyester or ester oligomers that are of interest since they lead to very high-solids binders.

It is, however, disadvantageous that such mixed systems comprising blends of acrylate polymers with oligoesters and with corresponding polyester-modified acrylate resins with a high proportion of oligoester no longer possess the desired rapid drying (freedom from tack) and do exhibit high molecular nonuniformity and poor chemical resistance properties. The high proportion of oligoester is responsible for these negative properties.

SUMMARY OF THE INVENTION

It was an object of the present invention to provide an acrylate/polyester system that overcomes the drawbacks of earlier systems.

It was also an object of the invention to provide a method of making and using such systems.

In accordance with the objects, there has been provided in accordance with the present invention, an acrylate copolymer (AB) obtained by addition polymerization of a monomer mixture (A), in an organic solvent or in bulk, the monomer mixture A comprising proportions by mass of (Aa) from 25 to 80% of one or more $C_1$–$C_{20}$-alkyl (meth)acrylates, whose alkyl radicals can be linear, branched, or cyclic, (Ab) from 1 to 28% of one or more $C_2$–$C_{20}$-hydroxyalkyl (meth)acrylates, whose hydroxyalkyl radicals can be linear, branched, or cyclic, (Ac) from 0.5 to 20% of one or more $\alpha,\beta$-unsaturated carboxylic acids, and (Ad) from 0 to 55% of one or more aromatic vinyl compounds, aliphatic vinyl esters and vinyl ethers, vinyl halides, olefinically unsaturated ketones or aldehydes, esters of glycidyl alcohol or methylglycidyl alcohol with olefinically unsaturated carboxylic acids, or nitrites of $\alpha,\beta$-unsaturated carboxylic acids, wherein the sum of the proportions by mass of the components (Aa) to (Ad) is 100%,
in the presence of one or more free-radical polymerization initiators and of at least one (B) polyester or polyester oligomer obtained by polycondensation of one or more polyols (Ba) and one or more polycarboxylic acids (Bb), and having a hydroxyl number of from 50 to 350 mg/g, an acid number of from 1 to 50 mg/g, and a weight-average molar mass $M_w$ of up to 5000 g/mol, with the provisos that the polyesters or polyester oligomers present during the addition polymerization of the mixture (A) are free from olefinic double bonds, that the proportion by mass of component (B) in the end product (AB) is less than 10%, of the mass thereof and that this end product has an acid number of from 5 to 45 mg/g, a hydroxyl number of from 40 to 125 mg/g and a weight-average molar mass $M_w$ of not more than 10,000 g/mol, and a polydispersity (=$M_w/M_n$; nonuniformity) of 3 or less than 3.

There has also been provided a process for preparing an acrylate copolymer (AB) discussed above comprising polycondensation in bulk of one or more aliphatic linear or branched polyfunctional hydroxyl compounds as (Ba) and one or more aromatic polyfunctional carboxylic acids as (Bb) to prepare a polyester (B), adding to (B) the monomer mixture (A), and polymerizing the monomer mixture (A) in the presence of the polyester (B) initiated by free-radical initiators, in bulk or in the presence of an inert organic solvent.

There is also provided a coating composition comprising one or more acrylate copolymers discussed above and one or more curing agents selected from amino resins, blocked and non-blocked polyfunctional isocyanates, polyfunctional carboxylic acids, and compounds containing acid anhydride groups, wherein the ratio of the number of hydroxyl groups of the acrylate copolymer to the number of hydroxyl-reactive groups of the crosslinker lies between 0.3:1 and 3:1.

There is also provided an article coated with such a coating composition.

Further objects, features, and advantages of the present invention will become apparent from the detailed description that follows.

DETAILED DESCRIPTION OF PREFERRED EMBODIMENTS

It was hitherto unknown that mixed systems comprising acrylate polymers and polyester oligomers do lead to uniform, transparent, polyester-modified acrylate resins with rapid drying, high chemical resistance and good levelling if the proportion of oligoesters is restricted.

These novel, highly transparent products are outstandingly suitable for use in high-solids coating formulations, both in clearcoats and in pigmented paints.

It has surprisingly been found that polymerization of specific olefinically unsaturated monomers in the presence of suitable polyesters or ester oligomers having a weight-average molar mass $M_w$ of not more than 5000 g/mol in proportions by mass of less than 10% in the reaction mixture makes it possible to prepare, by the advantageous one-pot method, binders which are of low molecular mass and, in particular, of narrow distribution and which comprise at least one kind of functionality which can be utilized for a crosslinking reaction (preferably hydroxyl or carboxyl groups, but also, for example, oxirane groups or carbonyl groups). These products are outstandingly suitable for use in the fields described above.

The present invention also relates to a process for preparing these low molecular mass, molecularly uniform, modified acrylate resins.

The use of such acrylate resins in coating compositions of all kinds is a further subject of this invention.

The acrylate copolymers AB of the invention are characterized in that they are obtainable by addition polymerization, in an organic solvent or in bulk, of a monomer mixture A comprising proportions by mass of Aa from 25 to 80% of $C_1$–$C_{20}$-alkyl (meth)acrylates whose alkyl radicals can be linear, branched or cyclic, Ab from 1 to 28% of $C_2$–$C_{20}$-hydroxyalkyl (meth) acrylates whose hydroxyalkyl radicals can be linear, branched or cyclic, Ac from 0.5 to 20% of α,β-unsaturated carboxylic acids, and Ad from 0 to 55% of aromatic vinyl compounds or aliphatic vinyl esters and vinyl ethers, vinyl halides, olefinically unsaturated ketones or aldehydes, esters of glycidyl alcohol or methylglycidyl alcohol with olefinically unsaturated carboxylic acids or nitriles of α,β-unsaturated carboxylic acids, the sum of the proportions by mass of the components Aa to Ad necessarily being 100% and the components Aa to Ad preferably being selected such that polymerization of this mixture A without further additions would result theoretically in an acrylate copolymer having an acid number of at least 5,for example of 5 to 60 mg/g, and a hydroxyl number of from 30 to 130 mg/g, in the presence of free-radical polymerization initiators and, if desired, of a regulator and of at least one B polyester or polyester oligomer (also referred to in this text as oligoester or ester oligomer) obtainable by poly-condensation of polyols Ba and polycarboxylic acids Bb, with or without the addition of monocarboxylic acids Bc and/or diisocyanates Bd, and having a hydroxyl number of from 50 to 350 mg/g, an acid number of from 1 to 50 mg/g and a weight-average molar mass $M_w$ of up to 5000 g/mol, with the proviso that the polyesters or polyester oligomers present during the addition polymerization of the mixture A are free from olefinic double bonds, that the proportion by mass of the component B in the end product AB is less than 10%, preferably from 0.5 to 9.5%, and, with particular preference, from 1.0 to 9.0% of the mass thereof and that this end product has an acid number of from 5 to 45 mg/g, a hydroxyl number of from 40 to 125 mg/g and a weight-average molar mass Ma of not more than 10,000 such as from about 3000 to about 10,000 g/mol and a polydispersity (=$M_w/M_n$; nonuniformity) of 3 or less than 3, for example, about 1.5 through 3. With particular preference the end product AB has an acid number of from 7 to 40 mg/g, a hydroxyl number of from 45 to 120 mg/g and a weight-average molar mass $M_w$ of not more than 9000 g/mol and a polydispersity ($M_w/M_n$) of less than 2.95.

In this context, $M_n$ is the number-average molar mass of the polymer. DIN 53 402 defines the acid number as the quotient of that mass of potassium hydroxide—$m_{KOH}$—which is required to neutralize a sample which is to be investigated and the mass $m_B$ of this sample (mass of the solid in the sample in the case of solutions or dispersions); its customary units are mg/g. DIN 53 240 defines the hydroxyl number as the quotient of that mass of potassium hydroxide—$m_{KOH}$—which has exactly the same number of hydroxyl groups as a sample to be investigated and the mass $m_B$ of this sample (mass of the solid in the sample in the case of solutions or dispersions); its customary units are mg/g.

The proportions by mass of the monomers in the mixture A are preferably from 30 to 70% for Aa, from 5 to 25% for Ab, from 1 to 10% for Ac and from 10 to 50% for Ad, the sum of the proportions by mass always being 100%. It is particularly important to observe the upper limit for the component Ab, since otherwise the binders have hydroxyl numbers of more than 125 mg/g, and when such binders are used in coating materials the result is brittle coatings with inadequate adhesion to the substrate.

The addition polymerization of the specific monomer mixture A takes place, in accordance with the invention, in the presence of polyester or ester oligomer B, the polyester-modified acrylate copolymer which forms acting increasingly as a phase mediator for the polyester or the ester oligomer in the mixture. This produces completely transparent resins.

The raw materials and preparation methods used for the modified acrylate resins of the invention are known in principle to the skilled worker, and so reference will be made only to specific selection criteria.

Any desired monomer (Aa) can be used. Examples of suitable monomers of group Aa include methyl, ethyl, propyl, isopropyl, butyl, tert-butyl, 2-ethylhexyl, lauryl, 4-tert-butylcyclohexyl and isobornyl esters of acrylic and methacrylic acid, particular preference being given to the methyl, butyl, 2-ethylhexyl and isobornyl acrylates and methacrylates.

Any desired monomer Ab can be used. Examples of suitable monomers of group Ab include hydroxyethyl, 3-hydroxypropyl, 4-hydroxybutyl, 2-hydroxypropyl and 2-hydroxybutyl acrylate and the corresponding methacrylates, and esters of acrylic and methacrylic acid with oligomeric propylene glycols. With preference, the hydroxyl group is either in the ω-position, i.e., on the carbon atom furthest from the ester group, or in the α-position with respect to the ester group. Particular preference is given to hydroxyethyl and 2-hydroxypropyl acrylate and methacrylate and the esters of acrylic and methacrylic acid with oligomeric hydroxypropylene glycols.

Any desired monomer Ac can be used. Particularly suitable as component Ac are acrylic and methacrylic acid, although use may also be made of other aliphatic, unsaturated, dicarboxylic acids or their anhydrides, such as maleic anhydride, fumaric acid and itaconic acid and the monoesters thereof. Acrylic and methacrylic acid are particularly preferred for Ac.

Any desired optional monomer (Ad) can be used. Examples of components under Ad include styrene, vinyltoluenes, vinyl chloride, olefinically unsaturated ketones and aldehydes, such as methyl vinyl ketone, (meth) acrolein, crotonaldehyde, diacetone(meth)acrylamide, diacetone (meth)acrylate, and mixed esters of aliphatic diols with (meth)acrylic acid and acetoacetic acid; acrylo- or methacrylonitrile, vinyl alkyl ethers, glycidyl esters or methylglycidyl esters of α,β-unsaturated carboxylic acids, and esters of vinyl alcohol with branched aliphatic saturated monocarboxylic acids, such as Versatic acid vinyl ester, for example. Particular preference is given to styrene, diacetone (meth)acrylamide, acrylo- and methacrylonitrile, glycidyl (meth)acrylate, glycidyl ethyl maleate, and the vinyl esters, obtainable under the tradename ®Veova, of α-branched aliphatic monocarboxylic acids having 5 to 18 carbon atoms in the carboxylic acid component.

The preparation of the copolymers of the invention can be carried out by customary methods of addition polymerization, examples being bulk, solution, or bead polymerization. The various polymerization methods are well known and are described, inter alia, in Houben-Weyl, Methoden der Organischen Chemie, 4th Edition, Volume 14/1,pp. 24–255 (1961), hereby incorporated by references in its entirety.

The solution polymerization method is preferred for the preparation of the copolymers of the invention. In a preferred method, the solvent and the polycondensate are charged to the reaction vessel and this initial charge is heated to boiling temperature, and the mixture of monomers and initiators is metered in continuously over a defined period. The polymerization is preferably conducted at temperatures between 100 and 220° C., preferably at from 130 to 200° C. The polymerization reaction is started using known polymerization initiators, examples being peroxides, hydroperoxides, peracids, their salts, or azo compounds.

In order to regulate the degree of polymerization regulators can be employed (chain transfer agents) such as mercaptans, thioglycolic esters, cumene, dimeric alpha-methylstyrene, etc.

The preferably hydroxyl- or carboxyl-containing copolymers prepared in accordance with the invention can in a further stage be subjected to chemical or physical modification by means, for example, of reaction with lactams or lactones. Reaction with isocyanate compounds is likewise useful. It is useful to incorporate low molecular mass urea derivatives, which lead to what are known in the coatings industry as sag controlled acrylate resins. For this purpose, for example, the copolymer is introduced in a mixture with monoamines or polyamines, and appropriate mono- or polyfunctional isocyanates are added.

The copolymers of the invention can be prepared batchwise or continuously. The multistage methods include the option of an embodiment in which the respective reaction stages are conducted in separate vessels. Also possible is a reaction in which a first stage is carried out continuously and a second stage batchwise.

The compounds employed as polycondensate B are polyester resins or ester oligomers which have a hydroxyl number of from 50 to 350, preferably from 70 to 200 mg/g, an acid number of from 1 to 50, preferably from 3 to 40 g/g and a weight-average molar mass $M_w$ of up to 5000, preferably from 500 to 4000 g/mol (GPC, polystyrene standard) and are free from olefinic double bonds. Any desired Ba and Bb can be used. Starting materials (precursors) employed are polyols (polyfunctional hydroxy compounds) Ba, preferably linear or branched aliphatic polyols and, with particular preference, dihydroxy compounds, and polycarboxylic acids (polyfunctional carboxylic acids) Bb, preferably aromatic polycarboxylic acids and, with particular preference, dicarboxylic acids, in each case individually or in a mixture. Both classes of precursors are free from olefinic double bonds.

In addition to the preferred difunctional components Ba and Bb it is possible to employ, often in a minor proportion, i.e. less than 10% of the mass of Ba or Bb in each case, of units with a functionality of three or more, or else monofunctional units, in the mixture, each of the components Ba and Bb independently of one another preferably having an average functionality of from 1.8 to 2.3.

Particular preference is given as component Ba to glycol, 1,2- and 1,3-propanediol, 1,4-butanediol, neopentyl glycol and 1,6-hexanediol, di- and triethylene glycol, di- and tripropylene glycol and monoethers of these glycols, trimethylolpropane and pentaerythritol. Particular preference is given as component Bb to the isomeric phthalic acids, trimellitic acid, trimesic acid, 2,3- and 2,6-naphthalenedicarboxylic acid and benzophenonetetracarboxylic acid and also their anhydrides. The polyester resins may (through the concomitant use in their synthesis of polyfunctional isocyantes, preferably diisocyantes Bd) if desired contain urethane groups and may be modified during polycondensation by the presence of monocarboxylic acids Bc which contain 5 to 20 carbon atoms. The raw materials and preparation methods employed for these purposes are known from the literature, for example from the book "Makromoleküle" by H. G. Elias, Verlag Hüthig+Wepf, Basel-Heidelberg 1971.

The copolymers of the invention can be used for any desired purpose and are particularly suitable for coating applications in 1- and 2-component systems, especially for what are known as high-solids systems, i.e. solvent-containing mixtures with a high solids content. A high solids system, in this context, is one where the solids (comprising the binder, additives and pigments) constitute a mass fraction of more than 50% of the liquid system, preferably more than 60%, and especially preferred, more than 70%. The higher number preferably apply to pigmented coating compositions, where typically, the ratio of mass of pigment to mass of binder is 0.8:1.

Any desired solvent can be used. Examples of suitable solvents for the copolymers of the invention include aliphatic, cycloaliphatic and aromatic hydrocarbons, such as alkylbenzenes, e.g. xylene, toluene; esters, such as ethyl acetate, butyl acetate, acetates with longer alcohol residues, butyl propionate, pentyl propionate, ethylene glycol monoethyl ether acetate, the corresponding methyl ether acetate, or propylene glycol methyl ether acetate; ethers, such as ethylene glycol acetate monoethyl, monomethyl or monobutyl ether; glycols; alcohols; ketones, such as methyl isoamyl ketone, methyl isobutyl ketone; lactones, and mixtures of such solvents. Reaction products of lactones with glycols or alcohols can also be employed as solvents.

The acrylate copolymers of the invention can also be employed as a blend with other hydroxyl-containing binder components known from polyurethane coatings technology. Blending with amine-type reactive diluents is a further option.

Other suitable hydroxyl-containing binder components include polyester-, polyether-, polycarbonate-, polyurethane- or polyacrylatepolyols. It is preferred to employ polyacrylatepolyols and polyesterpolyols and mixtures thereof. Suitable amine-type reactive diluents include products having blocked amino groups, such as aldimines, ketimines, oxazolidines or products having amino groups which are free yet of attenuated reactivity, such as substituted aspartic esters and β-hydroxy amines.

As suitable aldimines there may be mentioned reaction products of (preferably aliphatic) di- or polyamines with a (preferably aliphatic) aldehyde, such as the reaction products of isophoronediamine or bis(4-aminocylclohexyl) methane with isobutyraldehyde. Suitable ketimines are, for example, reaction products of the abovementioned amines with (preferably aliphatic) ketones, such as acetone or methyl isobutyl ketone.

Suitable oxazolidines can be prepared by reacting glycidyl esters of monobasic acids (such as glycidyl versatate) with (preferably aliphatic) di- or polyamines, such as isophoronediamine, to give a β-hydroxy amine which is reacted with aldehydes (preferably aliphatic aldehydes such as isobutyraldehyde) to give an oxazolidine. Other suitable oxazolidines are obtainable by reacting cyclic ketones, such as cyclohexanone, with short-chain aliphatic β-hydroxy amines having 2 to 8 carbon atoms, such as 2-aminoethyl-1,3-propanediol or DL-2-amino-butan-1-ol.

Suitable β-hydroxy amines which have not been reacted further are obtainable by addition reaction of aliphatic or cycloaliphatic amines, diamines or polyamines with sterically hindered glycidyl esters of aliphatic monocarboxylic acids that are substituted in the α-position by alkyl radicals; glycidyl esters of Versatic acids are preferred. Suitable substituted aspartic esters can be obtained by reacting esters of olefinically unsaturated dicarboxylic acids with (cyclo) aliphatic diamines such as bis(4-aminocyclohexyl)methane. The amine-type reactive diluents preferably possess more than one (blocked) amino group, since in this case they are incorporated in the crosslinking reaction.

The present invention additionally provides coating compositions which comprise the preferably hydroxyl-containing copolymers of the invention as binder components. The copolymers can be cured cold in the presence of appropriate crosslinkers, or at elevated temperature.

Any desired crosslinkers can be used. As curing component, these coating compositions suitably comprise amino resins, polyisocyanates and anhydride-functional compounds, individually or in combination. The crosslinker is generally added in each case in an amount such that the ratio of the number of OH groups of the copolymer to the number of hydroxyl-reactive groups of the crosslinker lies between 0.3:1 and 3:1.

Amino resins suitable as the curing component are preferably urea, melamine and/or benzoguanamine resins. These are etherified products of the condensation of urea, melamine or benzoguanamine, respectively with formaldehyde. Appropriate proportions by mass of copolymer and amine resin crosslinker (in each case the mass of the solid resin) are in the range from 50:50 to 90:10.Suitable phenolic resins and derivatives thereof can also be employed as curing agents. These crosslinkers lead to full curing of the coating in the presence of acids, an example being p-toluene sulphonic acid. Heat curing can be undertaken conventionally at temperatures from 80 to 200° C. in, for example, from 10 to 30 minutes.

Also suitable for the curing of the products of the invention with crosslinking are polyisocyanates, especially at moderate temperatures and at room temperature. Suitable polyisocyanate components are in principle all aliphatic, cycloaliphatic or aromatic polyisocyanates known from polyurethane chemistry, individually or in mixtures. Highly suitable examples are low molecular mass polyisocyanates, such as hexamethylene diisocyanate, 2,2,4- and/or 2,4,4-trimethyl-1,6-hexamethylene diisocyanate, dodecamethylene diisocyanate, tetramethyl-p-xylylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanatodicyclohexylmethane, 2,4'- and/or 4,4'-diisocyanatodiphenylmethane, or mixtures of these isomers with their higher homologues, which are obtainable in a manner known per se by phosgenating aniline-formaldehyde condensates; 2,4- and/or 2,6-diisocyanatotoluene or any desired mixtures of such compounds.

Preference is given, however, to derivatives of these simple polyisocyanates (known as paint polyisocyanates) which are commonly employed in coatings technology. They include polyisocyanates which have, for example, biuret, uretdione, isocyanurate, urethane, carbodiimide or allophanate groups, as are described, for example, in EP-A 0 470 461, hereby incorporated by reference.

The particularly preferred modified polyisocyanates include N,N',N"-tris(6-isocyanatohexyl)biuret and its mixtures with its higher homologues, and also N,N',N"-tris(6-isocyanatohexyl) isocyanurate and its mixtures with its higher homologues having more than one isocyanurate ring.

Crosslinking can be catalysed by the addition of volatile organic acids, such as formic acid and acetic acid, or organometallic compounds, such as tin compounds, with or without tertiary amines, preferably diethylethanolamine. Examples of suitable tin compounds are dibutyltin dilaurate, dibutyltin diacetate and dibutyloxotin (dibutyltin oxide, DBTO).

Suitable in addition for curing at elevated temperature are blocked polyisocyanates, polycarboxylic acids and/or their anhydrides.

The copolymers of the invention are particularly suitable for preparing high-solids, solvent-containing clearcoats. They are also highly suitable for preparing high-solids, solvent-containing pigmented coating materials.

These high-solids coating compositions are employed in particular in the coating of metal panels (especially in the case of automotive OEM finishing and refinishing, and for general industrial applications, such as steel bridges, for example), the coating of plastics and wood, and in the field of the coating of textiles, leather, paper and building materials.

The copolymers of the invention are also very suitable for producing powder coating materials, in conjuction with polycarboxylic anhydrides. They can also be reacted with polycarboxylic anhydrides, it being possible to employ the reaction products as curing agents for various acid-curable synthetic resins, especially epoxy resins. Of particular interest is the use of the products of the invention together with special polycarboxylic acid partial esters or derivatives of polycarboxylic acids and/or their anhydrides or ester anhydrides. Examples of such special polycarboxylic acids and their derivatives are alkane-dioic acids (linear aliphatic dicarboxylic acids) with 4 to 20 carbon atoms, e.g. succinic acid, suberic acid, pimelic acid, decane dioic acid, dodecane dioic acid, half esters of these acids with lower alkanols having from 1 to 4 carbon atoms like methanol and n-butanol, mixed anhydrides and mixed polyanhydrides of these acids.

Coating compositions prepared with the copolymers of the invention may also include other auxiliaries and additives which are customary in coatings technology. These include, in particular, catalysts, levelling agents, silicone oils, plasticizers, such as phosphates and phthalates, pigments such as iron oxides, lead oxides, lead silicates, titanium dioxide, barium sulphate, zinc sulphide, phthalocyanine complexes, etc., and fillers, such as talc, mica, kaolin, chalk, quartz flour, asbestos flour, slate flour, various silicas, silicates, viscosity-controlling additives, matting agents, UV absorbers and light stabilizers, antioxidants, peroxide scavengers, defoamers, wetting agents, active diluents and reactive diluents.

The coating compositions can be applied to the respective substrate by known methods, for example by spreading, dipping, flow coating or with the aid of rollers or doctor blades, but especially by spraying, electrostatic application and tribological application. They can be applied under hot conditions, and may if desired be brought into a ready-applied form by injection of supercritical solvents (e.g. $CO_2$). Any desired substrates can be used.

Cold curing of the coating materials takes place at temperatures in the range form −20 to +100° C., preferably from −10 to +60° C. Heat curing can be performed in the customary manner at temperatures from 80 to 200° C. within, for example, 10 to 30 minutes.

The invention is illustrated in more detail in the following examples. In the working examples as in the whole of the text, all figures bearing the unit "%" (per cent) are proportions by mass unless noted otherwise.

EXAMPLES

1) Preparing Suitable Polyester-Oligomers

1a) Preparing the Polyester B1

174 g of tripropylene glycol, 54 g of trimethylolpropane, 82 g of 1,6-hexanediol, 148 g of phthalic anhydride and 75 g of isophthalic acid were placed in a three-necked flask provided with stirrer, water separator, thermometer and reflux condenser and were esterified at 230° C. to an acid number of about 8 mg/g.

After cooling to 110° C., the batch was diluted with 69 g of butyl acetate to a solids content of 80% by mass.

The polyester B1 had an OH number of about 165 mg/g and a viscosity (50% strength solution in butyl acetate (BuoAc, at 23° C. in accordance with DIN EN ISO 3219) of 30 mPa·s. The weight-average molar mass $M_w$, determined by GPC, was about 2670 g/mol and the polydispersity was 2.5 (polystyrene calibration).

1b) Preparing the Polyester B2

A polyester as in Example 1a (same batch) was cooled to 110° C. after it had reached an acid number of about 8 mg/g, and was reacted with 16 g of phthalic anhydride. As soon as the acid number had reached a level of about 20 mg/g, the batch was diluted with 72 g of BuOAc to a solids content of 80% by mass.

The polyester B2 had an OH number of about 145 mg/g and a viscosity (50% strength solution in BuOAc, at 23° C. in accordance with DIN EN ISO 3219) of 34 mPa·s. The weight-average molar mass $M_w$, determined by GPC, was about 2980 g/mol and the polydispersity was 2.7 (polystyrene calibration).

2) Preparing Acrylate Polymers of the Invention

2a) Acrylate Copolymer

A 2 l three-necked flask equipped with stirrer, heating and cooling system, inert gas inlet and feed device was charged with 122 g of polyester solution B1 and 237.4 g of solvent naphtha 150/180 (hydrocarbon mixture with a boiling range of 150 to 180° C.), rendered inert with nitrogen and heated to the boiling temperature of 168° C. Then 281.9 g of butyl acrylate, 59.4 g of methyl methacrylate, 227.5 g of hydroxyethyl methacrylate, 14.8 g of acrylic acid, 405.6 g of styrene and 7.9 g of tert-dodecyl mercaptan were metered in through the dropping funnel over the course of 6 hours. At the same time, 19.8 g of di-tert-amyl peroxide dissolved in 99 g of solvent naphtha 150/180 were metered in. After 6 hours, further initiation was carried out with 2 g of di-tert-amyl peroxide in 10 g of solvent naphtha 150/180, and reaction was continued for 2 hours. The product was adjusted with 100 g of BuOAc to a solids content of 70.1% by mass (determined in accordance with DIN EN ISO 3251).

The end product was highly transparent and had the following characteristic data:

Acid number 10.8 mg/g, hydroxyl number 103 mg/g, dynamic viscosity (in accordance with DIN EN ISO 3219, at 23° C., supply form) 4600 mPa·s, dynamic viscosity (50% strength solution in BuOAc, in accordance with DIN EN ISO 3219, at 23° C.) 79 mPa·s.

The weight-average molar mass $M_w$ was 6900 g/mol, the polydispersity P was 2.6 (PS calibration).

2b) Acrylate Copolymer

A 2 l three-necked flask equipped with stirrer, heating and cooling system, inert gas inlet and feed device was charged with 68.8 g of polyester solution B2 and 240 g of solvent naphtha 150/180, rendered inert with nitrogen and heated to the boiling temperature of 168° C. Then 340 g of butyl acrylate, 60 g of methyl methacrylate, 175 g of hydroxyethyl methacrylate, 15 g of acrylic acid, 410 g of styrene and 8 g of tert-dodecyl mercaptan were metered in through the dropping funnel over the course of 6 hours. At the same time, 20 g of di-tert-amyl peroxide dissolved in 100 g of solvent naphtha 150/180 were metered in. After 6 hours, further initiation was carried out with 2 g of di-tert-amyl peroxide in 10 g of solvent naphtha 150/180, and reaction was continued for 2 hours. The product was adjusted with the addition of 100 g of BuOAc to a solids content of 69.2% by mass (determined in accordance with DIN EN ISO 3251).

The end product is highly transparent and has the following characteristic data:

Acid number 11 mg/g, hydroxyl number 75 mg/g, dynamic viscosity (in accordance with DIN EN ISO 3219, at 23° C., supply form) 3200 mPa·s, dynamic viscosity (50% strength solution in BuOAc, in accordance with DIN EN ISO 3219, at 23° C.) 80 mPa·s.

The weight-average molar mass $M_w$, determined by GPC, was about 7510 g/mol, the polydispersity P was 2.9 (polystyrene calibration).

3) Preparing Comparative Acrylate Copolymers

3a) Comparative Acrylate Copolymer

The comparative copolymer 3a was prepared as in Example 2a but without polyester B1.

The transparent copolymer 3a had the following characteristic data:

Solids content 69.9% by mass (DIN EN ISO 3251), acid number 12.5 mg/g, hydroxyl number 108 mg/g, dynamic viscosity (in accordance with DIN EN ISO 3219, at 23° C., supply form) 6400 mPa·s, dynamic viscosity (50% strength solution in BuOAc, in accordance with DIN EN ISO 3219, at 23° C.) 95 mPa·s. The weight-average molar mass $M_w$, determined by GPC, was about 8100 g/mol, the polydispersity P was 2.9 (polystyrene calibration).

3b) Comparative Acxylate Copolymer

The comparative copolymer 3b was prepared as in Example 2b but without polyester B2.

The transparent copolymer 3b had the following characteristic data:

Solids content 70.2% by mass (DIN EN ISO 3251), acid number 12.1 mg/g, hydroxyl number 79 mg/g, dynamic viscosity (in accordance with DIN EN ISO 3219, at 23° C., supply form) 8400 mPa·s, dynamic viscosity (50% strength solution in BuOAc, in accordance with DIN EN ISO 3219, at 23° C.) 85 mPa·s.

The weight-average molar mass $M_w$, determined by GPC, was about 8600 g/mol, the polydispersity P was 3.0 (polystyrene calibration).

3c, d, e) Comparative Acrylate Copolymers with Higher Proportions of Polyesters

As for the acrylate copolymer of Example 2a, mixed systems were prepared having a proportion by mass of oligoesters of more than 10% (Table 1). The solvent composition was adjusted as for the copolymer 2a.

TABLE 1

| Comparative copolymer | Unit | 3c | 3d | 3e |
|---|---|---|---|---|
| Proportion by mass of oligoester | % | 12 | 25 | 50 |
| Solids content by mass | % | 69.2 | 70.2 | 69.6 |
| Acid number | mg/g | 9.9 | 9.9 | 8.7 |
| Hydroxyl number | mg/g | 106 | 112 | 116 |
| Viscosity (supply form) | mPa.s | 2980 | 5475 | 1480 |
| Viscosity (50% strength in BuOAc) | mPa.s | 66 | 51 | 50 |
| $M_w$ | g/mol | 6320 | 5475 | 5045 |
| Dispersity = $M_w/M_n$ |  | 3.1 | 3.1 | 3.2 |

3f) Comparative Acrylate Copolymer with High OH Number

A 2 l three-necked flask equipped with stirrer, heating and cooling system, inert gas inlet and feed device was charged with 122 g of polyester solution B1 and 237.4 g of solvent naphtha 150/180, rendered inert with nitrogen and heated to the boiling temperature of 168° C. Then 281.9 g of butyl acrylate, 59.4 g of methyl methacrylate, 309.1 g of hydroxyethyl methacrylate, 14.8 g of acrylic acid, 325.2 g of styrene and 7.9 g of tert-dodecyl mercaptan were metered in through the dropping funnel over the course of 6 hours. At the same time, 19.8 g of di-tert-amyl peroxide dissolved in 99 g of solvent naphtha 150/180 were metered in. After 6 hours, further initiation was carried out with 2 g of di-tert-amyl peroxide in 10 g of solvent naphtha 150/180, and reaction was continued for 2 hours. The product was adjusted with 100 g of BuOAc to a solids content of 70.4% by mass (determined in accordance with DIN EN ISO 3251).

The transparent comparative product 3f had the following characteristic data:

Acid number 10.1 mg/g, hydroxyl number 140 mg/g, dynamic viscosity (in accordance with DIN EN ISO 3219, 23° C., supply form) 5140 mPa·s, dynamic viscosity (50% strength solution in BuOAc, in accordance with DIN EN ISO 3219, at 23° C.) 82 mPa·s. The weight-average molar mass $M_w$, determined by GPC, was 6860 g/mol, the polydispersity P was 2.8 (PS calibration).

4) Transparency of Acrylate Copolymer 2a and 2b in Comparison to Blends of Polyester B1 or B2 with Comparative Copolymer 3a or 3b The transparency of solutions of the acrylate copolymers 2a and 2b of the invention was assessed relative to that of solutions of the mixtures of comparative copolymer 3a and 3b with corresponding amounts of polyester B1 and B2 (Examples 1a and 1b) with the aid of a turbidity measurement. The amounts of comparative copolymer and polyester in this case were chosen so that the proportions by mass of the components in the mixtures were equal to those in the copolymers of the invention.

The proportion by mass of the acrylate copolymer of the invention (or the sum of the proportions by mass of copolymer and polyester) in the measurement solution was about 70%.

Turbidity measurement in a Hach nephelometer (model 2100 N):

|  | NTU |
|---|---|
| Acrylate copolymer 2a | 0.6 |
| Acrylate copolymer 2b | 0.7 |
| Mixture of comparative polymer 3a + polyester B1 | 1.6 |
| Mixture of comparative polymer 3b + polyester B2 | 1.8 (haze) |

NTU are nephelometric turbidity units, the comparison used being a freshly prepared formazine solution (dissolve 5 g of hydrazine sulphate in 400 ml of water and 50 g of hexamethylenetetramine in 400 ml of water, combine the solutions and make up to 1000 ml); after a storage period of 48 h at room temperature (20° C.) a turbidity is formed, corresponding to 4000 NTU, which remains unchanged over several months. A low value denotes low turbidity.

Result:

The mixtures of comparative polymer and polyester exhibit poorer transparency than the acrylate copolymers of the invention.

The transparence of the mixtures is not sufficient for the formulation of clearcoats (for which the turbidity determined in accordance with Hach must not be more than 1.5).

5) Preparing High-Solids Clearcoats

To prepare curable coating compositions of the invention the polymeric binder components (acrylate copolymer or polyester oligomer) are mixed with solvents and crosslinkers in the proportion described below (Table 2) and adjusted to spray viscosity (flow time of 21 s from the flow cup of DIN 52 211, 4 mm, 23° C.) with further diluent (universal diluent Solvesso 100:butyl acetate:xylene in a proportion by mass of 2:10:3).

TABLE 2

| Coating material<br>Binder from Example | 1<br>2a | 2 (compar.)<br>3c | 3 (compar.)<br>3d | 4 (compar.)<br>3e | 5 (compar.)<br>1a |
|---|---|---|---|---|---|
| Proportion of polyester by mass (%) | 9 | 12 | 25 | 50 | 100 |
| Solids content by mass (%) | 70.1 | 69.2 | 70.2 | 69.6 | 80 |
| Hydroxyl number (mg/g) | 103 | 106 | 112 | 116 | 165 |
| Viscosity* (mPa.s) | 79 | 66 | 51 | 50 | 30 |
| Binder (p) | 82 | 82 | 82 | 82 | 82 |
| Solvesso 100 (p) | 1.5 | 1.5 | 1.5 | 1.5 | 1.5 |
| Xylene (p) | 2.5 | 2.5 | 2.5 | 2.5 | 2.5 |
| Butyl acetate (p) | 11 | 11 | 11 | 11 | 11 |
| Desmodur N3390 (1:1) (p) | 22.5 | 22.9 | 24.5 | 25.2 | 41.2 |
| Universal diluent (p) | 29 | 29 | 25 | 19 | 27 |
| Flow time (s) | 21 | 21 | 21 | 21 | 21 | compar. = comparative coating materials
*: 50% solution n-butyl acetate
p = parts, by mass

6) Preparing Pigmented Topcoats

The acrylate copolymer 2a of the invention and the comparative acrylate copolymer 3a were used to prepare white-pigmented high-solids topcoats to the following recipe:

Component 6a:

Mixture 6a1: 50.7 g of acrylate copolymer 2a or comparative copolymer 3a; each 70% strength in BuOAc 36.2 g of ®Kronos 2310 titanium dioxide (Kronos Titan GmbH)

1.75 g of ®Additol VXL 62612 (wetting agent, Vianova Resins GmbH)

0.35 g of ®Additol XL 270 (flow additive, Vianova Resins GmbH)

3.55 g of xylene 3.55 g of methoxypropyl acetate 3.55 g of butyl acetate

Mixture 6a2: 0.20 g of ®Additol VXL 4930 (levelling agent, Vianova Resins GmbH)

0.10 g of ®Metatin 712 (tin catalyst, Acima GmbH)

0.05 g of diethylethanolamine

The mixture 6a1 was mixed in the stated sequence and homogenized in a bead mill for about 30 minutes. Then the mixture 6a2 was added and mixed in, with the resulting mixture 6a likewise being homogenized thoroughly. The flow time for mixture 6a (DIN 53 211, 4 min, 23° C.) was 100 s. The pigment/binder ratio was 0.8:1 by mass. Shortly before processing, component 6b was added to the mixture 6a:

Component 6b: 10.85 g of ®Desmodur N 3390, 90% strength solution (Bayer AG)

5.4 g of a mixture of BuOAc, Shellsol A and xylene in a ratio of 60:15:25 by mass The amount of component 6b added corresponds to 100% crosslinking (the amount of isocyanate component is such that the proportion of the molar amount of isocyanate groups to the molar amount of hydroxyl groups is 1). The mixture of 6a and 6b was adjusted by adding spray diluent (mixture of BuOAc, Shellsol A and xylene in a proportion of 60:15:25 by mass) to a flow time in the 4 mm DIN cup of 21 s (DIN 53 211, 23° C.).

7) Performance Testing of the Coating Material

7a) High-Solids Clearcoats

The clearcoat systems prepared as under 5 were applied to cleaned glass plates using a 100 μm knife and were tested under the conditions of air drying (Table 3).

TABLE 3

| Coating material | 1 | 2 (compar.) | 3 (compar.) | 4 (compar.) | 5 (compar.) |
|---|---|---|---|---|---|
| Solids content by mass* (%) | 53.5 | 53.9 | 55.4 | 56.2 | 65.7 |
| Flow time (s) after | | | | | |
| 0 h | 21 | 21 | 21 | 21 | 21 |
| 4 h | 31.5 | 26 | 27.5 | 22.5 | 28.5 |
| 6 h | 41.5 | 33 | 33 | 26 | 37 |
| Tack-free drying | 6 h | 20 h | 24 h | 24 h | 48 h |
| Chemical resistance after drying at room temperature for 4 d | | | | | |
| Super-group petroleum, 3 h exposure | sat. | sat. | tacky | tacky | tacky |
| Resistance to xylene | 70 min. | 45 min. | 45 min. | 30 min. | 5 min. |

*in accordance with DIN EN ISO 3251 (2 g + 2 ml of ethyl acetate, 1 h, 125° C.)
sat.: satisfactory Results:

In comparison to coating materials with a proportion by mass of polyester oligomer of more than 10% or to the pure oligoester coating material, the coating material 1 of the invention has much faster tack-free drying and a considerably better resistance to super-grade petroleum and, especially, xylene. The more rapid setting of the system is also evident in the decrease in the pot life (more rapid rise in flow time on storage).

7b) White Paints

With the white paints prepared in accordance with 6 from the acrylate copolymer 2a and the comparative acrylate copolymer 3a, the following results were obtained:

7ba) Solids content of the white paint

The solids content by mass was determined in accordance with DIN EN ISO 3251 (2 g of the sample+2 ml of ethyl acetate, dry residue after 1 h at 125° C.).

| Paint with acrylate copolymer 2a | 62.5% |
|---|---|
| Comparative paint with acrylate copolymer 3a | 60.1% |

7bb) Gloss, micro-tri-gloss 20° measured at a dry film thickness of from 50 to 60 μm

Paint with acrylate copolymer 2a 92

Comparative paint with acrylate copolymer 3a 90

7bc) Wave-scan

Paint with acrylate copolymer 2a

| Film thickness (μm) | 25 | 30 | 35 | 40 |
|---|---|---|---|---|
| $L_c$ | 59 | 52 | 44 | 29 |

Comparative paint with acrylate copolymer 3a

| Film thickness (μm) | 25 | 30 | 35 | 40 |
|---|---|---|---|---|
| $L_c$ | 60 | 60 | 60 | 61 |

By means of the wave-scan method it is possible to assess objectively the surface structure (orange peel) of a coating. The reflection of a laser beam (angle of incidence=angle of observation=60°) is measured over a path of 10 cm. The parameter indicated is the "long wave", which is calculated from the standardized variance a (of the longwave fraction, determined by Fourier analysis of characteristic lengths between 0.6 and 10 mm) of the reflected light intensity $I_s$ along the measurement path from s=0 cm to s=10 cm, in accordance with $$a = \frac{1000}{s \times \bar{I}^2} \times \int (I_s - \bar{I})^2 ds$$

where $\bar{I}$ is the average reflected light intensity in the measurement path.

The so-called long wave is then defined as $$L = 67 \cdot 1 \, g \, (1+a/20)$$

and the "corrected longwave" $L_c$ is obtained by eliminating obvious outliers in the reflection intensity. The greater the measured value for the (corrected) longwave $L_c$, the greater the surface phenomenon known as orange peel of the sample concerned.

7bd) Drying Characteristics

Development of König pendulum hardness, indication in seconds

| Forced drying (30 min at 80° C.); hardness after | 1 h | 1 d |
|---|---|---|
| Paint with acrylate copolymer 2a | 95 | 135 |
| Comparison paint with acrylate copolymer 3a | 86 | 126 |
| Room temperature drying hardness after | 1 h | 7 d |
| Paint with acrylate copolymer 2a | 33 | 84 |
| Comparison paint with acrylate copolymer 3a | 24 | 66 |

Results:

Relative to the comparison paint for a given flow time, the paint of the invention has a higher solids content by mass, a higher pendulum hardness with an equivalent or more rapid increase, a comparable gloss and a better surface quality (no orange peel as determined by the wave-scan method).

7bf) Adhesion

The acrylate copolymer 2a and the comparative acrylate copolymer 3f were used to prepare white paints as in 6.

For the paint based on the comparative acrylate copolymer 3f, the amount of curing component (component 6b) was increased such that the amount added corresponds to 100% crosslinking (the amount of isocyanate component is such that the ratio of the molar amount of isocyanate groups to the molar amount of hydroxyl groups is 1).

The resulting paint systems were applied to degreased iron panels by spraying (dry film thickness about 50 μm) and the adhesion was tested by means of cross hatching (DIN 53151) after 7 days of drying at room temperature and after forced drying (30 min at 80° C.) copolymer 3a 24 66

Room Temperature Drying, Cross Hatch (DIN 53151) After 7 Days:

| Paint with acrylate copolymer 2a: | Gt1 |
|---|---|
| Comparison paint with acrylate copolymer 3f: | Gt4 to Gt5 |

Forced Drying (30 min at 80° C.), Cross Hatch (DIN 53151) After 1 day:

| Paint with acrylate copolymer 2a: | Gt1 to Gt2 |
|---|---|
| Comparison paint with acrylate copolymer 3f: | Gt5 |

Cross hatch: Assessment: Gt0=best value, Gt5=worst value

Result:

Relative to the comparison paint and at a given dry film thickness, the paint of the invention shows much better adhesion to cold-rolled iron panels both after drying at room temperature and after forced drying (30 min at 80° C.). The inadequate adhesion of the comparison paint based on the acrylate copolymer 3f makes it unsuitable for use in industrial single-layer coatings.

Austrian Application 1326/97 filed Aug. 7, 1997 is hereby incorporated by reference in its entirety.

Other embodiments of the invention will be apparent to those skilled in the art from consideration of the specification and practice of the invention disclosed herein.

What is claimed is:

1. An acrylate copolymer (AB) obtained by addition polymerization of a monomer mixture (A), in an organic solvent or in bulk, the monomer mixture (A) comprising proportions by mass of (Aa) from 25 to 80% of one or more $C_1$–$C_{20}$-alkyl (meth)acrylates, whose alkyl radicals can be linear, branched, or cyclic, (Ab) from 1 to 28% of one or more $C_2$–$C_{20}$-hydroxyalkyl (meth)acrylates whose hydroxyalkyl radicals can be linear, branched, or cyclic, (Ac) from 0.5 to 20% of one or more α,β-unsaturated carboxylic acids, and vinyl compounds, aliphatic vinyl esters, aliphatic vinyl ethers, vinyl halides, esters of glycidyl alcohol or methylglycidyl alcohol with olefinically unsaturated carboxylic acids, or nitriles of α,β-unsaturated carboxylic acids, wherein the sum of the proportions by mass of the components (Aa) to (Ad) is 100%, in the presence of one or mote free-radical polymerization initiators and of at least one (B) polyester or polyester oligomer obtained by polycondensation of the or more polyols (Ba) and one or more polycarboxylic acids (Bb) and having a hydroxyl number of from 50 to 350 mg/g, an acid number of from 1 to 50 mg/g and a weight-average molar mass $M_w$ of up to 5000 g/mol, with the proviso that the polyesters or polyester oligomers present during the addition polymerization of the mixture (A) are free from olefinic double bonds, that the proportion by mass of component (B) in the end product (AB) is less than 10%, of the mass thereof and that this end product (AB) has an acid number of from 5 to 45 mg/g, a hydroxyl number of from 40 to 125 mg/g and a weight-average molar mass $M_w$ of from about 3000 to about 10,000 g/mol, and a polydispersity (=$M_w/M_n$; nonuniformity) of about 1.5 through 3.

2. An acrylate copolymer according to claim 1, wherein components (Aa) to (Ad) are selected such that polymerization of the mixture (A) without further additions would result theoretically in an acrylate copolymer having an acid number of from 5 to 60 mg/g and a hydroxyl number of from 30 to 130 mg/g.

3. An acrylate copolymer according to claim 1, wherein the polyester B is obtained by polycondensation of one or more aliphatic hydroxyl compounds as (Ba) and one or more aromatic carboxyl compounds as (Bb) and has a weight-average molar mass $M_w$ of from 500 to 4000 g/mol, an acid number of from 1 to 50 mg/g, and a hydroxyl number of from 50 to 300 mg/g, and where the precursors (Ba) and (Bb) are free from olefinic double bonds and possess in each case independently of one another an average functionality of from 1.8 to 2.3.

4. An acrylate copolymer according to claim 1, wherein the polyester B is obtained by polycondensation of one or more linear or branched aliphatic dihydroxy compounds as (Ba) and one or more aromatic dicarboxylic acids as (Bb).

5. A process for preparing an acrylate copolymer (AB) according to claim 1, comprising polycondensation in bulk of one or more aliphatic linear or branched polyfunctional hydroxyl compounds as (Ba) and one or more aromatic polyfunctional carboxylic acids as (Bb) to prepare said polyester (B), adding to (B) said monomer mixture (A), and polymerizing the monomer mixture (A) in the presence of the polyester (B) initiated by free-radical initiators, in bulk or in the presence of an inert organic solvent.

6. A coating composition comprising one or more acrylate copolymers according to claim 1 and one or more curing agents selected from amino resins, blocked and non-blocked polyfunctional isocyanates, polyfunctional carboxylic acids, and compounds containing acid anhydride groups, wherein the ratio of the number of hydroxyl groups of the acrylate copolymer to the number of hydroxyl-reactive groups of the curing agent lies between 0.3:1 and 3:1.

7. A coating composition according to claim 6, additionally comprising one or more other hydroxyl-containing binder components selected from polyester-, polyether-, polycarbonate-, polyurethane- or polyacrylate polyols, or one or more amine reactive diluents selected from aldimines, ketimines, oxazolidines, β-hydroxyamines, and substituted aspartic esters.

8. An article coated with a composition according to claim 6.

9. An article according to claim 8, wherein the article is selected from a metal panel, plastic, wood, leather, textiles, paper, and building material.

10. A powder coating material comprising a copolymer according to claim 1.

11. A reaction product of a copolymer according to claim 1 and a polycarboxylic anhydride.

\* \* \* \* \*